J. W. Petty,
Cotton Bale Tie,
Nº 62,560. Patented Mar. 5, 1867.
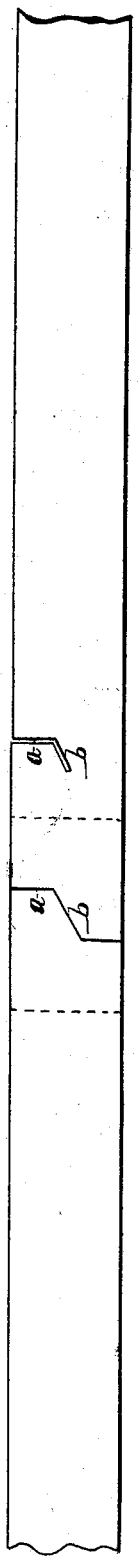
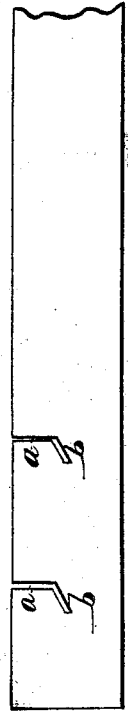
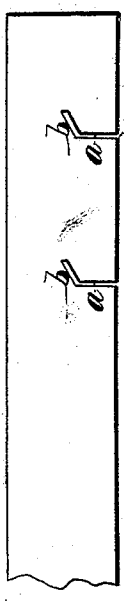
Fig. 1.
Fig. 2.
Witnesses.
Inventor.
J. W. Petty

United States Patent Office.

JOSEPH W. PETTY, OF NEW ORLEANS, LOUISIANA.

Letters Patent No. 62,560, dated March 5, 1867.

IMPROVEMENT IN COTTON-BALE TIE.

The Schedule referred to in these Letters Patent and making part of the same.

TO ALL WHOM IT MAY CONCERN:

Be it known that I, JOSEPH W. PETTY, of the city of New Orleans, parish of Orleans, and State of Louisiana, have invented a new and improved Cotton Tie; and I do hereby declare the following to be a full, clear, and exact description of the same, reference being had to the annexed drawings, making part of this specification, in which—

Figure 1 is a perspective view of the opposite ends of an iron band as fastened together by my method; and Figure 2, a similar view of the two ends detached from one another.

My invention looks to the creation of a mode of fastening the ends of iron bands together which shall dispense with the use of buckles, sleeves, and all other supplementary parts, whilst at the same time a firm and secure connection or tie is established between said ends. To accomplish these objects, I cut, with a suitable implement or machine especially constructed for the purpose, and operated either by hand or other power, a series of narrow clefts or openings into the opposite sides of the two ends of the band. These openings are cut straight across, or at right angles, to the length of the band, one-quarter of the width of the band, as shown at $a$ on the drawings, and then to the centre of the band at an angle of forty-five degrees, the opening turning towards the ends of the band, as shown at $b$ in both figures upon the drawings. The openings, it will be observed, are just wide enough to admit of the introduction of the bands edgewise into them, and being made in the opposite sides of the two ends, the fastening is effected by slipping the clefts or openings into each other, something after the manner in which wooden hoops are put together around barrels, so that the centres of the two ends are brought into coincidence or line with each other, as seen at fig. 1. The fastening is made whilst the bale is under compression, and as soon as the compression is taken off the bale and the tension, which the expansive force of the cotton within the bale induces, is brought to bear upon the bands, the oblique portions of the openings in the opposite ends of the bands bearing against each other, and, acting on the principle of the wedge, instantly bring the two ends of the band into line with each other and establish a firm and secure fastening between them; and the greater the tension the more tenacious becomes the fastening. If the angle of forty-five degrees, with respect to the outer or first half of the openings, that is given to the inner or last half of the same, be not enough to induce an immediate and secure tie the moment tension is put upon the bands, the angle may be reduced until it approximates to a right angle; but in all my experiments the result has been to fix the angle of forty-five degrees as between the two portions of the openings as the very best that can be devised, nor do I believe it will ever be found necessary in practice to depart from that angle. It sometimes happens that cotton is produced in such situations that in order to get it on board steamboats for transportation to market, it is requisite to precipitate it from high banks, and hence to subject it to violent concussion. When this is the case with respect to cotton bales banded by my method, it may become necessary, to prevent the unlocking of the tie, to drive through the laps of the two ends of the bands, slots being made therein for the purpose, flat-headed nails, from two to five inches in length, provided with barbs after the manner of an ordinary fish-hook. These barbs taking into the closely-compressed fibres of the cotton cannot be withdrawn, and thus they will effectually prevent the tie from unlocking, no matter how severe the concussion. By my invention bands may be prepared at the moment of using them, a hand machine for cutting the openings being provided, and thus the loss, which is incident to most other methods because of the necessity of previously preparing the bands, is entirely avoided. This advantage, added to that resulting from the non-requirement of supplementary parts, makes my method of fastening the cheapest of any of which I have any knowledge, whilst at the same time there is no tie that is more effective and secure.

Having thus described my invention, what I claim, and desire to secure by Letters Patent, is—

The combination of the two ends of an iron band, when used for banding cotton, when provided with the openings $a$ $b$, substantially as described for the purpose set forth.

J. W. PETTY.

Witnesses:
A. HERO, Jr.,
GEO. CENAS.